United States Patent [19]

Griffis

[11] Patent Number: 4,947,519
[45] Date of Patent: Aug. 14, 1990

[54] METHOD AND APPARATUS FOR EVISCERATING SCALLOPS

[75] Inventor: Edgar E. Griffis, Merritt Island, Fla.

[73] Assignee: Scallop Research, Inc., Merritt Island, Fla.

[21] Appl. No.: 222,137

[22] Filed: Jul. 21, 1988

[51] Int. Cl.$^5$ .............................................. A22C 29/00
[52] U.S. Cl. ............................................ 17/48; 17/53; 17/74
[58] Field of Search ................... 17/53, 73, 46, 74, 76, 17/71, 45

[56] References Cited

U.S. PATENT DOCUMENTS

| | | | |
|---|---|---|---|
| 2,778,055 | 1/1957 | Lapeyre et al. | 17/73 |
| 3,662,431 | 5/1972 | Willis | 17/48 |
| 3,662,432 | 5/1972 | Wenstrom et al. | 17/53 |
| 3,665,555 | 5/1972 | Willis | 17/53 |
| 3,740,795 | 6/1973 | Cox | 17/53 |
| 3,829,933 | 8/1974 | Lambert | 17/53 |
| 4,718,145 | 1/1988 | Silchenstept | 17/53 |

Primary Examiner—Willis Little
Attorney, Agent, or Firm—Duckworth, Allen, Dyer & Doppelt

[57] ABSTRACT

A plurality of shucked scallops are mechanically eviscerated utilizing a series of longitudinally aligned inclined channels, each channel formed of a bottom roller and adjacent side rollers, the side rollers extending generally parallel with and longitudinally coextensive with the bottom roller. The frictional surfaces of the rollers and the spacing between adjacent rollers, or both, are controlled to effectively separate the soft scallop viscerae from the soft adductor muscle of the scallops without significant damage to the muscles, that in such a manner as to be ineffective for the peeling of shrimp.

6 Claims, 2 Drawing Sheets

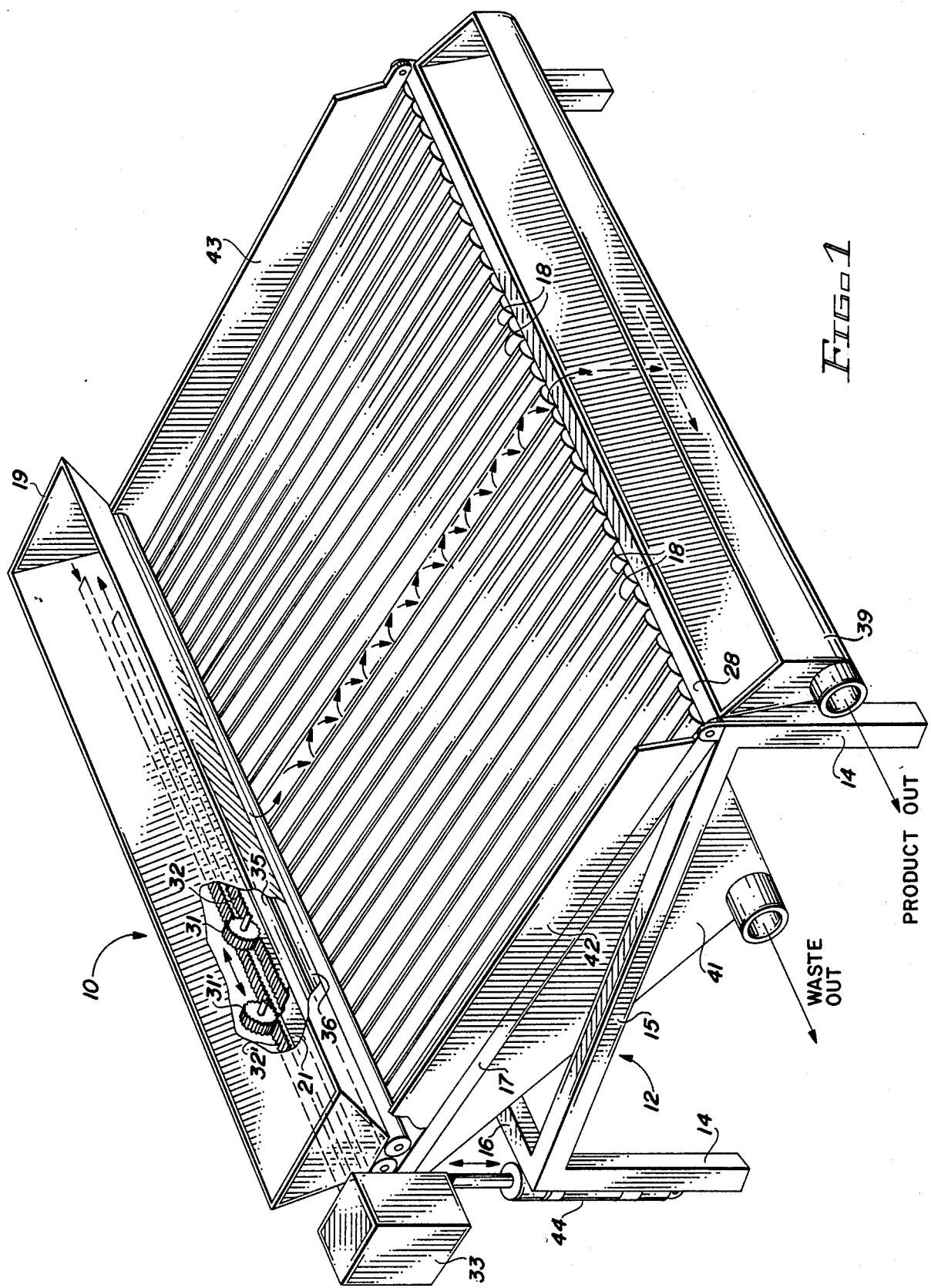

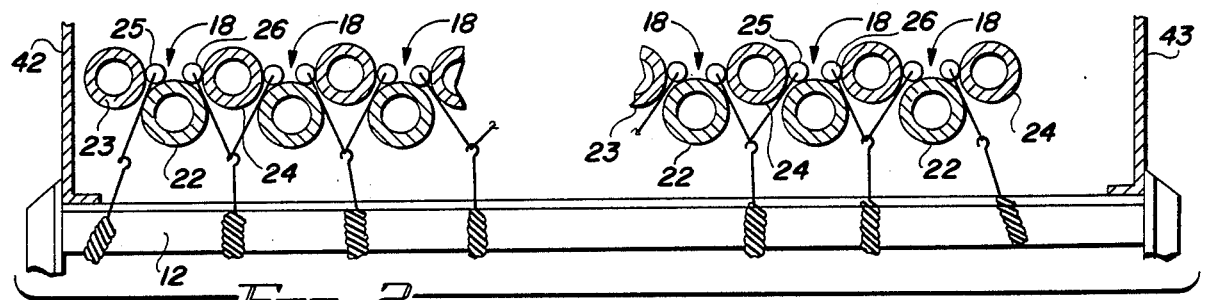
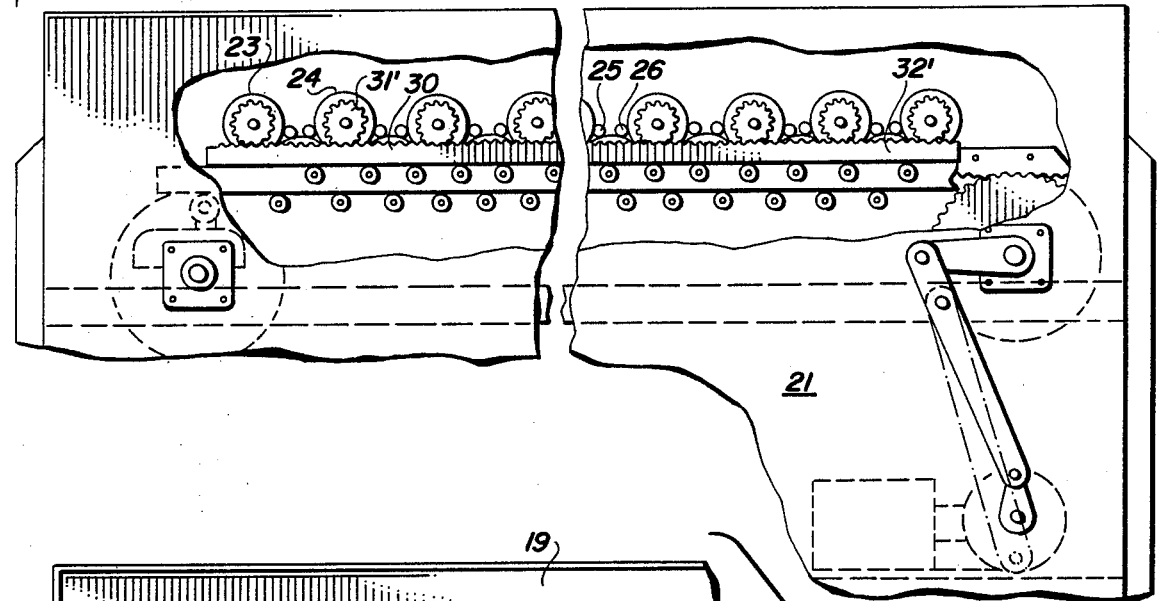
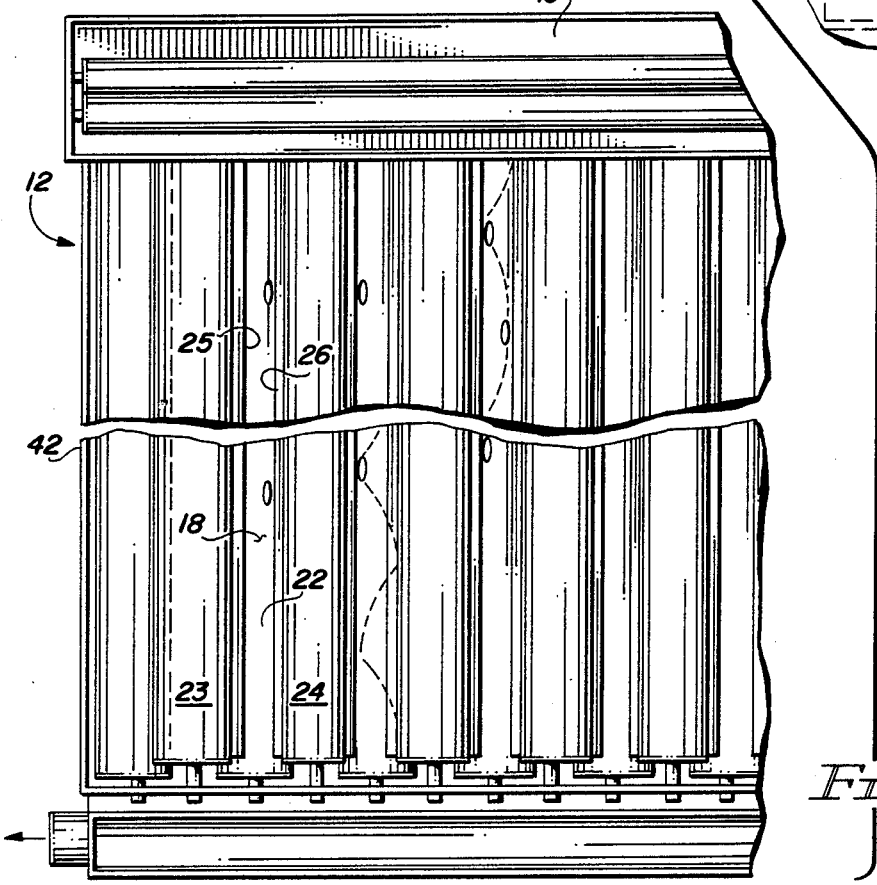

METHOD AND APPARATUS FOR EVISCERATING SCALLOPS

This invention relates to the processing of scallops, and more particularly relates to a method and apparatus for mechanically separating the viscera from the meat of shucked scallops.

BACKGROUND OF THE INVENTION

Scallops, along with oysters, clams and mussels, are members of a group of marine shellfish called bivalve mollusks. Scallops have three major components: two hard outer shell sections or valves; viscera known as "rim"; and a single large adductor muscle (also known as the "meat" or "eye").

The commercial preparation of scallops for U.S. consumption involves shucking, followed by eviscerating. Shucking is the separation of the adductor muscle from the shell, and eviscerating is the separation in the shucked scallop of the viscera from the adductor muscle. Scallop eviscerating is distinguishable from shrimp peeling in that the former involves the separation of soft cylindrical muscle from soft, stringy viscera, while the latter involves the separation of soft edible meat from hard, plate-like shell segments.

In the commercial processing of scallops shucking and eviscerating are generally performed in two distinct operations, one continuously following the other. The method and apparatus of the present invention relate to the eviscerating procedure, and are not directly concerned with the means employed to shuck the scallops, the same being able to be accomplished by any of various well-known mechanical or hand shucking techniques.

Conventional methods and apparatus for mechanically eviscerating scallops are set forth in Willis U.S. Pat. No. 3,562,855, and Wenstrom et al. U.S. Pat. Nos. 3,665,554 and 4,532,677. The generally utilized method involves removing the viscera from the muscle employing a plurality of parts of counterrotating rollers, arranged to form an inclined path descending from the input end of the eviscerator. Each of the rollers has its axis aligned transversely of the path and is positioned so that the surface of each intermediately positioned roller forms a nip with the adjacent roller on its input side and a nip with the adjacent roller on its output side. Drive means are provided for oscillating the rollers so that the upper exposed portion of adjacent rollers are alternately rotated toward each other to pull viscera from the scallop muscles and through the nip of the rollers, and alternately rotated away from each other to advance the scallops. The scallops move in the direction of the incline, substantially perpendicular to the axes of the rollers, being alternately pinched by the rollers and moved over the rollers from one roller to the next. A water spray is applied from above to the rollers to lubricate the rollers so that the scallop muscles rotate about their cyclindrical axes.

There is an emphasis in conventional mechanical scallop eviscerating technology on moving the shucked scallops transversely over the roller pairs, down the direction of the incline. There has been an avoidance of eviscerating systems in which the scallops move longitudinally along rollers or roller channels, such as are known for mechanical shrimp peeling as illustrated by the equipment shown in the LaPeyre et al U.S. Pat. No. 2,778,055 of The Laitram Corporation, New Orleans, La., and other patents of the same assignee. Reported attempts by those involved in the development of systems, such as those shown in the Willis and Wenstrom et al patents, to adopt shrimp peeling techniques and machinery to scallop eviscerating have been unsuccessful and were abandoned, and both applicants and examiners involved with patenting of scallop eviscerating methods and apparatus have established positions that the same are involved in nonanalogous art vis-a-vis shrimp peeling methods and apparatus.

SUMMARY OF THE INVENTION

The present invention provides a method and apparatus for the successful mechanical separation of viscera from meat of shucked scallops in which scallops are moved longitudinally along, rather than transversely over, rotating rollers. More particularly, the invention provides a system for mechanically separating the viscera from the meat of shucked scallops utilizing rolled configurations similar to those known for shrimp peeling processes.

In one aspect of the invention, scallops are introduced at a controlled rate adjacent the top of an inclined, water lubricated channel formed between aligned positively-driven bottom and side rollers, which have indirectly driven insert rollers positioned at the nips between the positively driven rollers. The scallops are moved longitudinally down along the water lubricated channel by cyclically reversing the direction of the rollers, driving adjacent positively-driven rollers in the same direction and indirectly driving the insert rollers in the opposite direction by contact with adjacent positively-driven rollers. As the scallops descend, they move from side-to-side on the bottom roller, causing the viscera of the scallops to be pinched and separated from the meat at the insert roller nips.

In a preferred embodiment of apparatus for practicing the method of the invention, described in greater detail below, bottom, side and insert rollers are arranged in aligned channels axially inclined in a configuration similar to that utilized for the upper peeling section of the Lapeyre et al '055 patent, mentioned above; however, with the roller nips set for scallop dimensions and the roller surfaces made to be less frictionally abrasive than roller surfaces normally employed in shrimp peeling equipment. The preferred apparatus utilizes a novel rack gear arrangement to drive the bottom and side rollers.

BRIEF DESCRIPTION OF THE DRAWINGS

Embodiments of the invention have been chosen for purposes of illustration and description, and are considered in connection with the accompanying drawings, wherein:

FIG. 1 is an embodiment of apparatus for mechanically separating the viscera from the meat of shucked scallops, useable in practicing the method of the invention.

FIG. 2 is a vertical transverse section taken at an enlarged scale along the line 2—2 of line 1.

FIG. 3 is an enlarged rear elevational view of the apparatus of FIG. 1 with portions of the back plate broken away showing the roller drive mechanism; and, FIG. 4 is a schematic view helpful in understanding the method of the invention employing the apparatus of the invention.

Throughout the drawing, like elements are referred to by like numerals.

DESCRIPTION OF THE PREFERRED EMBODIMENTS

The principles of the method and apparatus of the invention are illustrated in preferred embodiments thereof described with reference to the drawings, and particularly to FIGS. 1-3 which show an exemplary machine 10 for eviscerating shucked scallops. The machine 10 has a framework 12, having legs 14 and intervening structural members 15, 16 that support an inclined table or platform 17 on which a series of rollers is mounted to present aligned paths or channels 18 running generally longitudinally of the incline of the table and into which fresh, uncooked shucked scallops are received, for eviscerating thereof. The invention does not rely on any particular means for accomplishing the shucking and so discussion of the same is not necessary, the previously issued patent literature providing numerous examples of how shucking can be accomplished.

The scallops are delivered free from their shells to the machine 10 and deposited into a hopper or guide trough 19, through any appropriate agency, such as a flighted endless belt elevator like that disclosed in the Willis '855 patent. The hopper 19 is positioned above the top ends of the channels 18 and extends across the width of the table 17, just ahead of a rear vertical wall 21 at the top of the incline.

The channels 18 are formed, similarly to the channels in the shrimp peeling apparatus of the '055 patent, by groups or associations of five rollers to the unit, and as many units as desired may be repeated transversely across the machine 10 to provide a machine 10 having a desired eviscerating capacity.

As shown in FIG. 2, the association of rollers in each path 18 comprises a bottom roller 22 which forms the base of the channel, two parallel, side rollers 23 and 24 which are mounted at a higher elevation than the power base roller 22 and spaced apart horizontally to the sides of the roller 22, and insert rollers 25 and 26 mounted respectively between the bottom roller 22 and the side rollers 23 and 24. In contrast to the shrimp peeling machine of the '055 patent, the side rollers 23, 24 and the insert rollers 25, 26 extend along with the bottom rollers 22 for substantially the full length of the machine 10, i.e. they do not stop midway. The bottom and side rollers 22, 23 and 24 are supported at the back wall 21 and at their lower ends by conventional means, and all of the rollers are inclined forwardly and downwardly from the back wall to the front beam 28 (although as with the structure of the '055 patent, an inclination is not essential where arrangements are made to compel travel down the channels under force of a stream of water as described in LePeyre et al U.S. Pat. No. 2,537,355).

As with the machinery of the '055 patent, the bottom and side rollers 22, 23 and 24 all have fixed locations and are of a diameter which is large in comparison with the diameters of the insert rollers 25, 26. The bottom rollers 22 and the side rollers 23 and 24 are mounted relative to one another so that their peripheries are separated a distance at their nearest points which is somewhat less than the diameters of the insert rollers 25, 26. This is for the purpose of enabling the insert rollers 25, 26, which are not fixedly mounted but are resiliently supported in a manner similar to that disclosed for the shrimp peeling machine of the '055 patent, to be forcably urged constantly by spring pressure into the restricted throats between the rollers 22 and the rollers 23, 24. The spring pressure to which the insert rollers 25, 26 is subjected is set to supply good frictional contact between each bottom roller 22, the insert rollers 25, 26 and the respective side rollers 23, 24, and also to provide the desired nip or bight between the insert rollers 25, 26 and the bottom roller 22 to properly capture the viscera strings, as the scallops move longitudinally down along the channels 18.

FIG. 2 shows six of the bottom rollers 22 mounted across the width of the machine in horizontally spaced, substantially parallel relation; and eight of the side rollers 23, 24 mounted in aligned laterally spaced relationships thereto. As shown, the side roller on the left of each channel 18 serves also as the side roller on the right of the next adjacent channel 18'. Thus, as with the peeling machine of the LePeyre '055 patent, all except the end side rollers 23, 24 serve as side rollers for the opposite sides of adjacent parallel channels 18. Unlike the machine of the '055 patent, however, the rollers 23, 24 are longitudinally coextensive with the rollers 22, the machine 10 not being divided into upper and lower sections. Though only six channels 18 are shown in FIG. 2, it will be appreciated that any number of channels may be utilized. A typical envisioned configuration will have 10 to 12 channels 18 and utilize bottoms and side rollers 22, 23 and 24 of identical 70 inch length and 3 inch diameter. The use of different diameter rollers is, however, also possible.

The bottom and side rollers 22, 23 and 24 are given an oscillating movement through a desired angular degree, such as one and one-half turns in each direction, through an appropriate actuating mechanism, such as the double rack and gear drive arrangement shown in FIGS. 1 and 3. As shown, each positively-driven roller 22, 23 and 24 is mounted for free rotation at its lower end and is equipped with a pinion 31 at its upper end which engages a reciprocating tooth rack 32 accommodated adjacent the rear vertical wall 21, and driven by conventional drive means 33. The pinions 31' of the elevated rollers 23, 24 are spaced rearwardly of the pinions 31 of the bottom rollers 22, so that separate simultaneously driven racks 32, 32' can be reciprocated to conveniently positively drive all the rollers 22, 23 and 24 in the same direction. It will be appreciated by those skilled in the art to which the invention relates that simultaneous oscillating of the rollers 22 and the rollers 23, 24 can be achieved with a single rack and gearing, or with other substitute arrangements. However, the double rack arrangement shown is found to be free of complexity and involves a minimum of components. Furthermore, users of conventional mechanical scallop eviscerating systems (see Willis '855 and Winstrom et al '432 and '554 patents) are used to rack and pinion drives; though, in contrast to the apparatus of the present invention, the conventional systems utilize rack gears on opposite sides of an inclined table structure to drive alternate, single level rollers in counterrotation.

The illustrated, preferred tandem rack arrangement has the advantage over a single rack system in that a rotation speed differential can be established, if desired, between the rollers 22 and the rollers 23 and 24. Creating a differential will provide a slip to the insert rollers 25, 26 which are indirectly driven by the positively driven rollers 22, 23 and 24. This provides a capability for adjusting the frictional interaction between the insert rollers and the positively driven rollers, to give additional control for the process of pulling and tearing the stringy viscera material away from the cylindrical meat.

The insert rollers 25, 26 are held in the nips between the side rollers 23, 24 and the bottom roller 22 by hold-down devices of conventional construction, such as disclosed in LePeyre et al U.S. Pat. No. 3,706,113. The force of engagement between the indirectly driven rollers 25, 26 and the positively-driven rollers 22, 23 and 24 is adjusted to provide nips on either side of the bottom roller 22 of each channel 18 which will perform satisfactory removal of the viscera.

The roller surfaces are chosen to have a frictional interaction that separates soft viscera from soft meat, without destroying the meat. This is contrary to the roller surface selection process for shrimp peeling machinery. It is common in shrimp peeling machines, see for example LePeyre et al U.S. Pat. No. 3,704,484, for the insert rolls to be grooved or otherwise roughened and sharpened on their outer surfaces to better grasp the appendages of shrimp and the edges of shrimp shells during the peeling process. The use of such rough surfaces may be too abrasive for scallop eviscerating. For the apparatus of the present invention, it is preferable that the external cylindrical surfaces of the insert rolls be much less abrasive. They are suitably sandblasted to provide some roughness, but are not otherwise roughened or sharpened. The external surfaces of the rolls 25, 26 may, for example, approximate the worn down, sandblasted surfaces discussed as undesirable for shrimp peeling machines in the '484 patent. The positively-driven rollers 22, 23 and 24 may be of rubber, or other suitable composition, such as commercially available for machinery such as shown in the LePeyre et al '055 patent. A suitable roughness of the lightly sandblasted surfaces of the insert rollers 25, 26 is one that provides a frictional contact with rollers 22, 23 and 24, approximating that of the exterior surfaces of the viscera pinching rollers utilized in the systems of the Willis and Winstrom et al patents.

At the discharge port of the hopper 19, two transversely positioned, oppositely-rotating feed rollers 35, 36 are fitted extending the width of the unit 10. The purpose of these rollers is to distribute the scallops into the upper ends of the channels 18 in reasonable separation across the width of the machine 10. The feed rollers 35, 36 can be driven by any appropriate means.

An output trough 39 extends widthwise, transversely across the machine 10 adjacent the bases of the inclined rollers channels. The trough 39 serves as a catch basin for the cleaned scallop meat and may be inclined to one side of the machine 10 as shown to transport the cleaned scallop meat away from the machine 10 to an inspection station or other further processing or packaging downstream scallop processing location. A discharge pan 41 is provided below the full length and width of the roller paths 18 of the inclined table 17, as shown, to collect the separated viscera from the rollers. A water spray mechanism (not shown) is provided to lubricate the rollers and to assist in cleaning the removed viscera from the rollers. The sides of the table of the machine 10 are provided with end plates 42, 43 to prevent edge spillage.

In operation, uncooked, shucked scallops deposited into the hopper 19 are passed at a controlled rate through the feed rolls 35, 36 into the upper ends of the channels 18. The inclination of the channels and the rolling action of the rollers causes the scallops to move down the channels 18 longitudinally along the upper surfaces of the bottom rollers 22. The oscillatory motion imparted to the rollers shifts the scallops alternately from side to side within the channels presenting the scallops in constantly changing positions to unpinching action of the respective nips between the insert rollers 25, 26 and the bottom rollers 22 for removal of the viscera. The movement of the scallops down the channels and the separation of the viscera from the meat is facilitated by water spray directed above and below the channels.

In contrast to the shrimp peeling machinery, the angle of incline of the roller paths 18 will generally be less than that used for shrimp and will approximate the angle of incline currently used on conventional eviscerating machines. As shown in FIG. 1, the angle of incline may be made variable by hydraulic means by providing support to the upper end of the inclined table by pistons 44 located adjacent each rear leg 14 and by providing a pivotal connection between the front of the inclined table and the upper ends of the front legs 14. Also it is noted that, unlike the shrimp peeling machinery of the '055 patent, no pressure fingers are provided above the table for up and down movement against the tops of the scallops.

As is apparent from the foregoing description, the invention provides a method and apparatus for the mechanical separation of viscera from meat in shucked scallops, in which scallop viscera are separated by the pinching action of roller nips during descent of scallops down an inclined path, longitudinally in alignment with the roller axes. Tests run by the inventor with equipment of the type described have been successful, and it is apparent that the method of the invention will present a viable alternative to conventional mechanical separation processes that utilize intermittent tumbling of scallops transversely over a series of pairs of reversely rotating rollers.

It will be appreciated by those skilled in the art to which the invention relates that various substitutions and modifications may be made to the described embodiments, without departing from the spirit and scope of the invention as defined by the appended claims.

What is claimed is:

1. A method of mechanically eviscerating the viscera from the meat of the shucked scallop, comprising the steps of:
   introducing a plurality of scallops at a controlled rate into a series of longitudinally aligned inclined channels, each channel being formed between a bottom roller and side rollers;
   moving the scallops from side to side down along the channels while rotating the rollers to rotate the scallop about their axes while progressively pinching and successively removing the viscera, and then cleaning the viscera therefrom; and
   rotating the bottom roller at a rotational speed different than that of the side rollers.

2. The method of claim 1 further comprising the step of adjusting the frictional interaction between the bottom and side rollers so as to effectively separate the soft scallop viscerae from the soft adductor muscle of the scallops, without significant damage to the muscle.

3. The method recited in claim 1 further comprising the initial steps of:
   inserting the scallops into a hopper having an opposing pair of feed rollers extending laterally across the series of longitudinally aligned inclined channels; and spreading the scallops across and through the feed rollers and then into the longitudinally aligned channels.

4. A method of mechanically eviscerating the viscera from the meat of a shucked scallop, comprising the steps of:
introducing a plurality of scallops at a controlled rate into a series of longitudinally aligned inclined channels, each channel being formed between a bottom roller and side rollers;
moving the scallops from side to side down along the channels while rotating the rollers to rotate the scallop about their axes while progressively pinching and successively removing the viscera, and then cleaning the viscera therefrom; and
adjusting the frictional interaction between the bottom and side rollers so as to effectively separate the soft scalloped viscerae from the soft adductor muscle of the scallops, without significant damage to the muscle, by rendering the surfaces of the bottom or side rollers, or both, sufficiently frictional to be effective for separating the soft scallop viscerae from the soft scallop muscles, but ineffective to peel shrimp, the rendering step comprising lightly sandblasting the surfaces of the rollers or changing the dimension between the rollers, or both.

5. A method for mechanically eviscerating the adductor muscle for a plurality of shucked scallops, comprising the steps of:
providing a series of longitudinally aligned inclined channels, each channel formed of a bottom roller and adjacent side rollers, the side rollers extending generally parallel with the bottom roller;
moving the scallops along the channels while rotating the bottom roller at a rotational speed different than the side rollers to rotate the scallop about their own axis while progressively pinching and removing the viscerae; and
controlling the frictional surfaces of the rollers or the spacing between the rollers, or both, to effectively separate the soft scallop viscerae from the soft adductor muscle of the scallops without significant damage to the muscles, but in such a manner as to be ineffective for the peeling of shrimp.

6. The method of claim 5 further comprising the step of spreading the plurality of scallops across the top of the inclined channels prior to the moving step.

* * * * *